(12) United States Patent
Dersjö et al.

(10) Patent No.: US 10,584,772 B2
(45) Date of Patent: Mar. 10, 2020

(54) TRANSMISSION ARRANGEMENT FOR A VEHICLE (71) Applicant: VOLVO CONSTRUCTION EQUIPMENT AB, Eskilstuna (SE)

(72) Inventors: Jan Dersjö, Eskilstuna (SE); Per Mattsson, Hindås (SE); Mathias Lehikoinen, Västerås (SE); Mats Åkerblom, Eskilstuna (SE); Jörg Müller, Chemnitz (DE); Mirko Leesch, Gelenau (DE); Rico Resch, Chemnitz (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 15/758,254

(22) PCT Filed: Sep. 9, 2015

(86) PCT No.: PCT/SE2015/050948
§ 371 (c)(1),
(2) Date: Mar. 7, 2018

(87) PCT Pub. No.: WO2017/044021
PCT Pub. Date: Mar. 16, 2017

(65) Prior Publication Data
US 2018/0231104 A1 Aug. 16, 2018

(51) Int. Cl.
F16H 3/66 (2006.01)
F16H 61/686 (2006.01)

(52) U.S. Cl.
CPC .............. F16H 3/66 (2013.01); F16H 61/686 (2013.01); F16H 2200/0065 (2013.01);
(Continued)

(58) Field of Classification Search
CPC .... F16H 3/66; F16H 1/686; F16H 2200/0078; F16H 2200/0073; F16H 2200/2097;
(Continued)

(56) References Cited

U.S. PATENT DOCUMENTS 3,503,282 A 3/1970 Peterson
7,549,942 B2 6/2009 Gumpoltsberger
(Continued)

FOREIGN PATENT DOCUMENTS

CN 104033550 A 9/2014
DE 102006026597 A1 3/2007
(Continued)

OTHER PUBLICATIONS

International Search Report (dated May 12, 2016) for corresponding International App. PCT/SE2015/050948.
(Continued)

Primary Examiner — Justin Holmes
(74) Attorney, Agent, or Firm — Sage Patent Group (57) ABSTRACT A transmission arrangement for a vehicle includes a first, a second, a third, and a fourth planetary gear set including a sun gear, a planet carrier and a ring gear, respectively, wherein the transmission arrangement further includes a transmission housing, an input shaft and an output shaft, wherein the sun gear of the first planetary gear set and the input shaft are operatively connected to each other; the ring gear of the first planetary gear set and the ring gear of the second planetary gear set are operatively connected to each other; the planet carrier of the second planetary gear set and the sun gear of the third planetary gear set are operatively connected to each other; the sun gear of the second planetary gear set and the planet carrier of the third planetary gear set are operatively connected to each other; the planet carrier of the third planetary gear set and the ring gear of the fourth
(Continued)

planetary gear set are operatively connected to each other; and the planet carrier of the fourth planetary gear set and the output shaft are operatively connected to each other.

12 Claims, 1 Drawing Sheet (52) U.S. Cl.
CPC ........... *F16H 2200/0069* (2013.01); *F16H 2200/0073* (2013.01); *F16H 2200/0078* (2013.01); *F16H 2200/0091* (2013.01); *F16H 2200/2012* (2013.01); *F16H 2200/2048* (2013.01); *F16H 2200/2097* (2013.01)

(58) Field of Classification Search
CPC ..... F16H 2200/0065; F16H 2200/2012; F16H 2200/0091; F16H 2200/0069; F16H 2200/2048
See application file for complete search history.

(56) References Cited

U.S. PATENT DOCUMENTS

| | | | |
|---|---|---|---|
| 8,382,634 B2 | 2/2013 | Beck et al. | |
| 8,992,371 B1* | 3/2015 | Shim | F16H 3/66 475/276 |
| 9,702,439 B2 | 7/2017 | Kook et al. | |
| 10,174,814 B2 | 1/2019 | Schoolcraft et al. | |
| 10,253,850 B2 | 4/2019 | Irving et al. | |
| 10,260,599 B2 | 4/2019 | Richardson et al. | |
| 10,323,723 B2 | 6/2019 | Earhart et al. | |
| 10,337,591 B2 | 7/2019 | Irving et al. | |
| 10,428,912 B2* | 10/2019 | Hwang | F16H 3/666 |
| 10,436,288 B2* | 10/2019 | Kim | F16H 3/66 |
| 10,458,522 B2* | 10/2019 | Cho | F16H 3/66 |
| 2007/0129205 A1 | 6/2007 | Jang | |
| 2007/0129206 A1 | 6/2007 | Jang | |
| 2007/0161453 A1 | 7/2007 | Iwasaki et al. | |
| 2008/0039266 A1 | 2/2008 | Shim | |
| 2008/0161149 A1 | 7/2008 | Diosi et al. | |
| 2009/0197734 A1* | 8/2009 | Phillips | F16H 3/66 475/276 |
| 2010/0227729 A1 | 9/2010 | Wittkopp et al. | |
| 2011/0105267 A1 | 5/2011 | Wittkopp et al. | |
| 2012/0178572 A1 | 7/2012 | Hart | |
| 2012/0214636 A1 | 8/2012 | Hart et al. | |
| 2012/0214638 A1 | 8/2012 | Hart et al. | |
| 2012/0302393 A1* | 11/2012 | Seo | F16H 3/663 475/276 |
| 2014/0235398 A1 | 8/2014 | Lippert | |
| 2015/0111690 A1 | 4/2015 | Shim et al. | |
| 2015/0133258 A1* | 5/2015 | Beck | F16H 3/66 475/275 |
| 2015/0233471 A1 | 8/2015 | Yoshida et al. | |
| 2017/0016516 A1 | 1/2017 | Foster et al. | |
| 2018/0245670 A1 | 8/2018 | Dersjö et al. | |
| 2018/0259041 A1 | 9/2018 | Dersjö et al. | |

FOREIGN PATENT DOCUMENTS

| | | |
|---|---|---|
| DE | 102006055842 A1 | 4/2008 |
| DE | 102010061402 A1 | 6/2012 |
| DE | 102013205387 A1 | 10/2014 |
| SE | 527108 C2 | 11/2005 |
| SE | 527108 C2 | 12/2005 |
| WO | WO 02079669 A1 | 10/2002 |
| WO | WO 2012052283 A1 | 4/2012 |
| WO | WO 2013159991 A1 | 10/2013 |
| WO | WO 2013159996 A1 | 10/2013 |
| WO | WO 2013160000 A1 | 10/2013 |
| WO | WO 2014185827 A1 | 11/2014 |
| WO | WO 2015039768 A1 | 3/2015 |

OTHER PUBLICATIONS

International Search Report and Written Opinion dated May 12, 2016 for International App. PCT/SE2015/050946, 12 pages.
International Search Report and Written Opinion dated May 17, 2016 for International App. PCT/SE2015/050947, 9 pages.
Extended European Search Reported dated Apr. 1, 2019 for European Patent Application No. 15903700.1, 15 pages.
Extended European Search Reported dated Apr. 1, 2019 for European Patent Application No. 15903701.9, 15 pages.
Extended European Search Reported dated Apr. 1, 2019 for European Patent Application No. 15903702.7, 15 pages.

* cited by examiner

FIG. 1

FIG. 2

TRANSMISSION ARRANGEMENT FOR A VEHICLE

BACKGROUND AND SUMMARY

The present invention relates to a transmission arrangement for a vehicle. The invention also relates to a vehicle comprising such a transmission arrangement. The invention is applicable on vehicles, in particularly working machines such as e.g. wheel loaders, articulated haulers, dump trucks, etc. Although the invention will mainly be described in relation to an articulated hauler, it may also be applicable for other types of vehicles such as e.g. trucks.

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

In order to fulfil the desired demands from the fields where the working machine is frequently operated, high performance of the vehicle gearbox is necessary. The gearbox is arranged for adjusting the speed and tractive effort of the vehicle in dependency of the specific driving scenario. The gearbox comprises a transmission arrangement and depending on the specific type of gearbox, the transmission arrangement may comprise e.g. ordinary gear sets with cylindrical gear wheels in meshed connection with each other or planetary gear sets comprising a respective sun gear, ring gear and a planet carrier, or a combination of ordinary gear sets and one or more planetary gear sets.

SE 527 108 describes a vehicle transmission arrangement, particularly suitable for working machines. The transmission arrangement in SE 527 108 comprises an input shaft and an output shaft. Five planetary gear sets are arranged between the input shaft and the output shaft for providing the desired gear ratios. Also, the transmission arrangement comprises three clutches and five brakes for achieving the desired gear shifts. Hereby, nine forward gears and four reverse gears are provided for the transmission arrangement in SE 527 108.

Although the transmission arrangement in SE 527 108 provides for a sufficient number of gears, the transmission arrangement is still in need of further improvements in terms of costs and functionality.

It is desirable to provide a transmission arrangement that enables fewer components to be used and has an improved gear shiftability in comparison to the prior art.

According to a first aspect of the present invention, there is provided a transmission arrangement for a vehicle, the transmission arrangement comprising a first, a second, a third, and a fourth planetary gear set comprising a sun gear, a planet carrier and a ring gear, respectively, wherein said transmission arrangement further comprises a transmission housing, an input shaft and an output shaft, wherein the sun gear of the first planetary gear set and the input shaft are operatively connected to each other; the ring gear of the first planetary gear set and the ring gear of the second planetary gear set are operatively connected to each other; the planet carrier of the second planetary gear set and the sun gear of the third planetary gear set are operatively connected to each other; the sun gear of the second planetary gear set and the planet carrier of the third planetary gear set are operatively connected to each other; the planet carrier of the third planetary gear set and the ring gear of the fourth planetary gear set are operatively connected to each other; and the planet carrier of the fourth planetary gear set and the output shaft are operatively connected to each other.

The wording "operatively connected to" should in the following and throughout the entire description be interpreted such that the components thereof are fixedly connected to each other, i.e. the rotational speeds of the components which are operatively connected to each other are equal. Hence, no engagement and disengagement mechanism or the like is arranged between the components that are operatively connected to each other and they can therefore not be disengaged from one another during operation. Accordingly, the planet carrier of the fourth planetary gear set is always connected to the output shaft of the transmission arrangement.

An advantage of the present invention is that, in comparison to the prior art, only four planetary gear sets are used in order to obtain a sufficient number of forward and reverse gears. This is advantageous both in terms of cost and packaging of the transmission arrangement since the number of components reduces the total cost for the transmission arrangement at the same time as it will be easier to fit the transmission arrangement to a vehicle. The engine compartment is an environment where it often is desirable to reduce the size of the components housed therein and the present invention hence reduces the size of the transmission arrangement by having one less planetary gear set in comparison to the prior art.

Moreover, by means of the present invention, nine forward gears and three reverse gears are obtainable, where the ratios and the steps for the different gears are considered to be able to appropriately operate e.g. a working machine to provide sufficient speed when necessary and sufficient torque when necessary. The ratio and step for the different obtainable gears will be described further below in relation to the detailed description of the present invention.

A still further advantage is that further additional gears and alternative gears in addition to the nine forward gears and the three reverse gears described above are obtainable. These additional gears and alternative gears will also be described further below in relation to the detailed description of the present invention.

According to an example embodiment, the transmission arrangement may comprise a first connecting mechanism for selectively connecting the input shaft to the sun gear of the fourth planetary gear set. The first connecting mechanism may, for example, be a clutch arrangement, such as e.g. a wet or dry friction disc clutch. Other alternatives are of course also conceivable.

The wording "selectively connectable to" should be understood to mean that the components thereof are connectable to each other such that, when being connected to each other, the components have equal rotational speeds. Hence, the components may be directly connectable to each other or via another component.

According to an example embodiment, the transmission arrangement may comprise a second connecting mechanism for selectively connecting the planet carrier of the fourth planetary gear set to the sun gear of the third planetary gear set and to the planet carrier of the second planetary gear set. The second connecting mechanism may, for example, be a clutch arrangement, such as e.g. a wet or dry friction disc clutch. Other alternatives are of course also conceivable.

According to an example embodiment, the transmission arrangement may comprise a third connecting mechanism for selectively connecting the sun gear of the fourth planetary gear set to the ring gear of the first planetary gear set and to the ring gear of the second planetary gear set. The third connecting mechanism may, for example, be a clutch arrangement, such as e.g. a wet or dry friction disc clutch. Other alternatives are of course also conceivable.

According to an example embodiment, the transmission arrangement may comprise a fourth connecting mechanism for selectively connecting the planet carrier of the second planetary gear set to the planet carrier of the first planetary gear set. The fourth connecting mechanism may, for example, be a clutch arrangement, such as e.g. a wet or dry friction disc clutch. Other alternatives are of course also conceivable.

According to an example embodiment, the transmission arrangement may comprise a first locking mechanism for selectively locking the planet carrier of the third planetary gear set and the ring gear of the fourth planetary gear set to the transmission housing. The first locking mechanism may, for example, be a brake arrangement, such as e.g. a wet or dry friction disc brake. Other alternatives are of course also conceivable. Hereby, the planet carrier of the third planetary gear set and the ring gear of the fourth planetary gear set, as well as the sun gear of the second planetary gear set, can be locked to the transmission housing such that rotation thereof is prevented.

According to an example embodiment, the transmission arrangement may comprise a second locking mechanism for selectively locking the ring gear of the third planetary gear set to the transmission housing. The second locking mechanism may, for example, be a brake arrangement, such as e.g. a wet or dry friction disc brake. Other alternatives are of course also conceivable. Hereby, the ring gear of the third planetary gear set can be locked to the transmission housing such that the ring gear is prevented from rotating.

According to an example embodiment, the transmission arrangement may comprise a third locking mechanism for selectively locking the planet carrier of the first planetary gear set to the transmission housing. The third locking mechanism may, for example, be a brake arrangement, such as e.g. a wet or dry friction disc brake. Other alternatives are of course also conceivable. Hereby, the planet carrier of the first planetary gear set can be locked to the transmission housing such that the planet carrier is prevented from rotating.

According to an example embodiment, the stationary gear ratio of each one of the first, second, third and fourth planetary gear sets may be negative. An advantage is that single planet wheels are used, which reduces cost and gear mesh losses.

According to a second aspect of the present invention there is provided a method for controlling a transmission arrangement, the transmission arrangement comprising a first, a second, a third, and a fourth planetary gear set comprising a sun gear, a planet carrier and a ring gear, respectively, wherein said transmission arrangement further comprises a transmission housing, an input shaft and an output shaft, wherein the sun gear of the first planetary gear set being operatively connected to the input shaft; the ring gear of the first planetary gear set being operatively connected to the ring gear of the second planetary gear set; the planet carrier of the second planetary gear set being operatively connected to the sun gear of the third planetary gear set; the sun gear of the second planetary gear set being operatively connected to the planet carrier of the third planetary gear set; the planet carrier of the third planetary gear set being operatively connected to the ring gear of the fourth planetary gear set; the planet carrier of the fourth planetary gear set being operatively connected to the output shaft; wherein the transmission arrangement further comprises: a first connecting mechanism for selectively connecting the input shaft to the sun gear of the fourth planetary gear set; a second connecting mechanism for selectively connecting the planet carrier of the fourth planetary gear set to the sun gear of the third planetary gear set and to the planet carrier of the second planetary gear set; a third connecting mechanism for selectively connecting the sun gear of the fourth planetary gear set to the ring gear of the first planetary gear set and to the ring gear of the second planetary gear set; a fourth connecting mechanism for selectively connecting the planet carrier of the second planetary gear set to the planet carrier of the first planetary gear set; a first locking mechanism for selectively locking the planet carrier of the third planetary gear set and the ring gear of the fourth planetary gear set to the transmission housing; a second locking mechanism for selectively locking the ring gear of the third planetary gear set to the transmission housing; and a third locking mechanism for selectively locking the planet carrier of the first planetary gear set to the transmission housing; wherein for at least one of the gears of the transmission arrangement, the method comprises the steps of: positioning three of the locking and connecting mechanisms in an engaged state; and positioning four of the locking and connecting mechanisms in a disengaged state.

Hereby, the majority of elements are disengaged for the different gears of the transmission arrangement, which thus may increase durability of friction components etc.

According to an example embodiment, the method may comprise the step of positioning the second and the third locking mechanisms, and the first connecting mechanism in an engaged state when engaging a first forward gear. According to an example embodiment, the method may comprise the step of positioning the first and the second locking mechanisms, and the first connecting mechanism in an engaged state when engaging a second forward gear. According to an example embodiment, the method may comprise the step of positioning the second locking mechanism, and the first and the second connecting mechanisms in an engaged state when engaging a third forward gear. According to an example embodiment, the method may comprise the step of positioning the second locking mechanism, and the first and the third connecting mechanisms in an engaged state when engaging a fourth forward gear. According to an example embodiment, the method may comprise the step of positioning the second locking mechanism, and the first and the fourth connecting mechanisms in an engaged state when engaging a fifth forward gear. According to an example embodiment, the method may comprise the step of positioning the second locking mechanism, and the third and the fourth connecting mechanisms in an engaged state when engaging a sixth forward gear. According to an example embodiment, the method may comprise the step of positioning the first, the third and the fourth connecting mechanisms in an engaged state when engaging a seventh forward gear. According to an example embodiment, the method may comprise the step of positioning the third locking mechanism, and the third and the fourth connecting mechanisms in an engaged state when engaging an eighth forward gear. According to an example embodiment, the method may comprise the step of positioning the third locking mechanism, and the first and the fourth connecting mechanisms in an engaged state when engaging a ninth forward gear.

Thus, well defined forward gears are provided for the transmission arrangement.

According to an example embodiment, the method may comprise the step of positioning the second, third and fourth connecting mechanisms in an engaged state when engaging an alternative seventh forward gear having a gear ratio equal to the seventh forward gear of the transmission arrangement.

Hereby, an alternative to the above defined seventh forward gear can be provided for the transmission arrangement. The alternative seventh forward gear gives a lower maximum torque on the fourth connecting mechanism in comparison to the seventh forward gear.

According to an example embodiment, the method may comprise the step of positioning the first and the third locking mechanisms, and the third connecting mechanism in an engaged state when engaging a first reverse gear. According to an example embodiment, the method may comprise the step of positioning the second and the third locking mechanisms, and the third connecting mechanism in an engaged state when engaging a second reverse gear. According to an example embodiment, the method may comprise the step of positioning the second and the third locking mechanisms, and the second connecting mechanism in an engaged state when engaging a third reverse gear.

Thus, well defined reverse gears are provided for the transmission arrangement.

According to an example embodiment, the method may comprise the step of positioning the third locking mechanism, and the second and the third connecting mechanisms in an engaged state when engaging a first additional reverse gear having a gear ratio lower than the gear ratio of the third reverse gear in terms of absolute values.

According to an example embodiment, the method may comprise the step of positioning the third locking mechanism, and the first and the second connecting mechanisms in an engaged state when engaging a second additional reverse gear having a gear ratio lower than the gear ratio of the third reverse gear in terms of absolute values.

Hereby, the transmission arrangement provides for additional reverse gears which are faster than the third reverse gear.

It should be readily understood that the above defined example embodiments of forward and reverse gears may be combined in any suitable combination.

Further effects and features of the second aspect of the present invention are largely analogous to those described above in relation to the first aspect of the present invention.

According to a third aspect of the present invention there is provided a control unit configured to control a transmission arrangement, the transmission arrangement comprising a first, a second, a third, and a fourth planetary gear set comprising a sun gear, a planet carrier and a ring gear, respectively, wherein said transmission arrangement further comprises a transmission housing, an input shaft and an output shaft, wherein the sun gear of the first planetary gear set being operatively connected to the input shaft; the ring gear of the first planetary gear set being operatively connected to the ring gear of the second planetary gear set; the planet carrier of the second planetary gear set being operatively connected to the sun gear of the third planetary gear set; the sun gear of the second planetary gear set being operatively connected to the planet carrier of the third planetary gear set; the planet carrier of the third planetary gear set being operatively connected to the ring gear of the fourth planetary gear set; the planet carrier of the fourth planetary gear set being operatively connected to the output shaft; wherein the transmission arrangement further comprises: a first connecting mechanism for selectively connecting the input shaft to the sun gear of the fourth planetary gear set; a second connecting mechanism for selectively connecting the planet carrier of the fourth planetary gear set to the sun gear of the third planetary gear set and to the planet carrier of the second planetary gear set; a third connecting mechanism for selectively connecting the sun gear of the fourth planetary gear set to the ring gear of the first planetary gear set and to the ring gear of the second planetary gear set; a fourth connecting mechanism for selectively connecting the planet carrier of the second planetary gear set to the planet carrier of the first planetary gear set; a first locking mechanism for selectively locking the planet carrier of the third planetary gear set and the ring gear of the fourth planetary gear set to the transmission housing; a second locking mechanism for selectively locking the ring gear of the third planetary gear set to the transmission housing; and a third locking mechanism for selectively locking the planet carrier of the first planetary gear set to the transmission housing; wherein for at least one of the gears of the transmission arrangement, the control unit is configured to position three of the locking and connecting mechanisms in an engaged state; and position four of the locking and connecting mechanisms in a disengaged state.

Effects and features of the third aspect of the present invention are largely analogous to those described above in relation to the first and second aspects of the present invention.

According to a fourth aspect of the present invention there is provided a vehicle comprising a prime mover and a gearbox, wherein the gearbox comprises a transmission arrangement according to any one of the embodiments described above in relation to the first aspect of the present invention.

Effects and features of the fourth aspect of the present invention are largely analogous to those described above in relation to the first, second and third aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

DEFINITIONS

The relationship between the rotational speeds of the different members in a planetary gear set is defined according to the following:

$$\frac{\omega_S - \omega_P}{\omega_R - \omega_P} = R \quad \text{(Eq. 1)}$$

wherein
$\omega_S$ is the speed of rotation of the sun gear;
$\omega_P$ is the speed of rotation of the planet carrier;
$\omega_R$ is the speed of rotation of the ring gear; and
R is the stationary gear ratio of the planetary gear set.
As used herein, the expression "stationary gear ratio" R for a planetary gear set is defined as the ratio of the speed of rotation of the sun gear to the speed of rotation of the ring gear in a situation in which the planet carrier is stationary, i.e.:

$$R = -\frac{z_R}{z_S} \text{ for single planet gear wheels} \quad \text{(Eq. 2)}$$

and $$R = +\frac{z_R}{z_S} \text{ for double planet gear wheels} \quad \text{(Eq. 3)}$$

wherein
$z_R$ is the number of teeth of the ring gear; and
$z_S$ is the number of teeth of the sun gear.

In a similar manner, the expression "ratio" for a transmission arrangement should be understood to relate to the number of revolutions of the input shaft of the transmission arrangement divided by the number of revolutions of the output shaft of the transmission arrangement. Furthermore, the expression "step" should be understood to mean the quotient achieved when the ratio of a gear is divided by the ratio of an adjacent gear of a transmission arrangement.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAILED DESCRIPTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
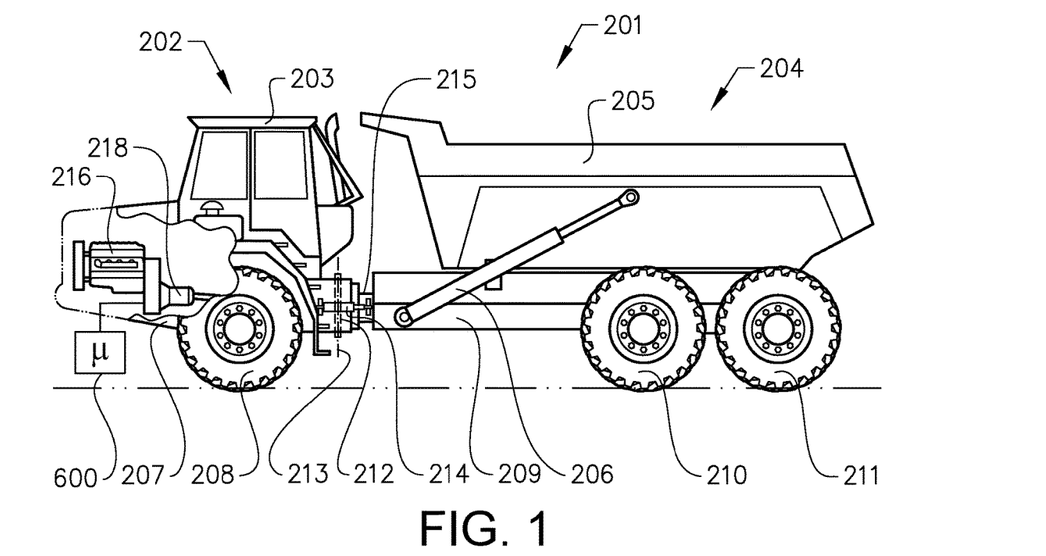
FIG. 1 is a lateral side view illustrating a working machine in the form of an articulated hauler.

FIG. 1 is a side view of a working machine 201 in the form of an articulated hauler having a tractor unit 202 with a cab 203 for a driver and a trailer unit 204 with a platform having a dump body 205, here in the form of a container, arranged thereon, for receiving load. The dump body 205 is preferably pivotally connected to the rear section and tiltable by means of a pair of tilting cylinders 206, for example hydraulic cylinders. The tractor unit 202 has a frame 207 and a pair of wheels 208 suspended from the frame 207. The trailer unit 204 has a frame 209 and two pair of wheels 210, 211 suspended from the frame 209.

The working machine is frame-steered, i.e. there is a joint arrangement 212 connecting the tractor unit 202 and the trailer unit 204 of the working machine 201. The tractor unit 202 and the trailer unit 204 are pivotally connected to each other for pivoting around a substantially vertical pivot axis 213.

The working machine preferably comprises a hydraulic system having two hydraulic cylinders 214, steering cylinders, arranged on opposite sides of the working machine for turning the working machine by means of relative movement of the tractor unit 202 and the trailer unit 204. The hydraulic cylinders can, however, be replaced by any other linear actuator for steering the machine, such as an electro-mechanical linear actuator.

Furthermore, the articulated hauler comprises a prime mover 216, here illustrated as an internal combustion engine, and a gearbox 218 having a transmission arrangement according to the example embodiment described below in relation to FIG. 2. Still further, the articulated hauler also comprises a control unit 600 connected to the gearbox for controlling the below described transmission arrangement. The control unit 600 may be, or form part of, already existing control units for controlling a gearbox.

Figure 2:
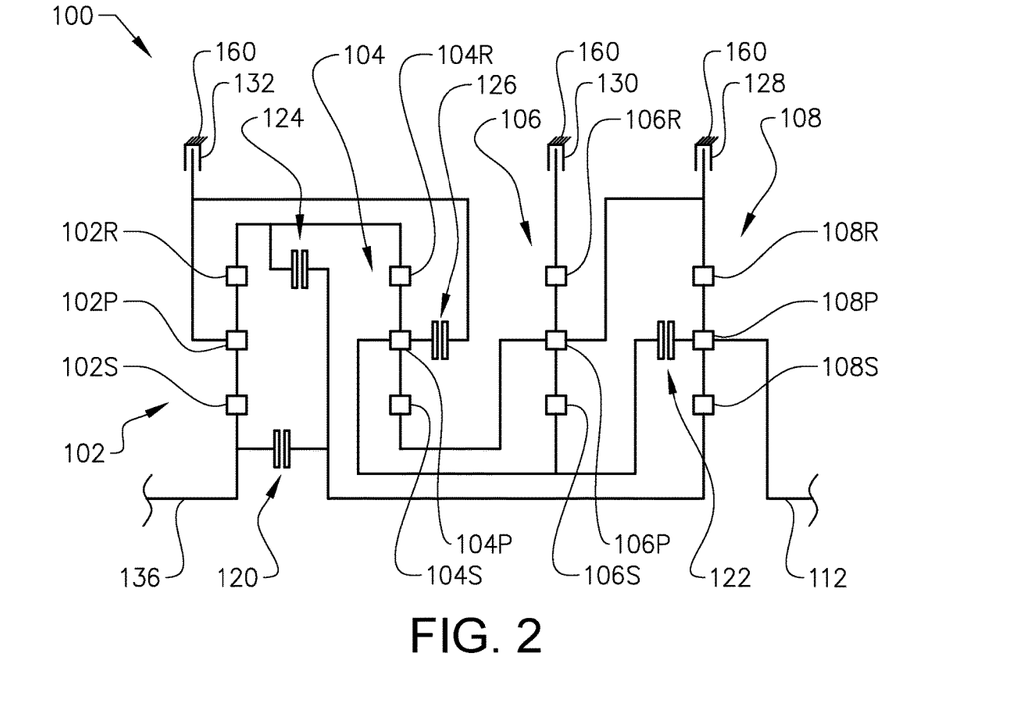
FIG. 2 schematically illustrates a transmission arrangement according to an example embodiment of the present invention.

Now, with reference to FIG. 2, an example embodiment of a transmission arrangement 100 according to the present invention is illustrated. The transmission arrangement 100 comprises a first planetary gear set 102 comprising a sun gear 102S, a planet carrier 102P and a ring gear 102R, a second planetary gear set 104 comprising a sun gear 104S, a planet carrier 104P and a ring gear 104R, a third planetary gear set 106 comprising a sun gear 106S, a planet carrier 106P and a ring gear 106R, and a fourth planetary gear set 108 comprising a sun gear 108S, a planet carrier 108P and a ring gear 108R. The transmission arrangement 100 further comprises an input shaft 136 for receiving a rotary motion/torque from the prime mover 216 of the vehicle 201 and an output shaft 112 for providing a rotary motion/torque to the driven wheels of the vehicle 201.

The different members of the planetary gear sets 102, 104, 106, 108 of the transmission arrangement 100, i.e. the sun gear, the planet carrier and the ring gear, are in the example embodiment depicted in FIG. 2 configured according to the following. It should be readily understood that the different members described below are connected to each other, either directly, i.e. operatively connected, or via a connecting mechanism, i.e. selectively connectable. The members can be operatively connected to each other by means of e.g. a connector element. Such connector element can be e.g. a solid shaft, a hollow shaft or a drum, or other suitable element for connecting two members to each other, which elements are known to the person skilled in the art. Hence, no explicit explanation is given below in regards to the means connecting the members to each other.

The input shaft 136 of the transmission arrangement 100 is operatively connected to the sun gear 102S of the first planetary gear set 102. Hence, the sun gear 102S of the first planetary gear set 102 is at all times directly connected to the input shaft of the transmission arrangement 100. Further, the input shaft 136 and the sun gear 102S of the first planetary gear set 102 are selectively connectable to the sun gear 108S of the fourth planetary gear set 108 by means of a first connecting mechanism 120.

The ring gear 102R of the first planetary gear set 102 is operatively connected to the ring gear 104R of the second planetary gear set 104. The ring gear 102R of the first planetary gear set 102 is also selectively connectable to the sun gear 108S of the fourth planetary gear set 108 by means of a third connecting mechanism 124. Moreover, the planet carrier 102P of the first planetary gear set 102 is selectively connectable to the transmission housing 160 by means of a third locking mechanism 132. Hence, the third locking mechanism 132, when being engaged, initially reduces the rotational speed of the planet carrier 102P of the first planetary gear set 102, and thereafter locks the planet carrier 102P of the first planetary gear set 102 to the transmission housing 160. The planet carrier 102P of the first planetary gear set 102 is also selectively connectable to the planet carrier 104P of the second planetary gear set 104 by means of a fourth connecting mechanism 126.

The planet carrier 104P of the second planetary gear set 104 is operatively connected to the sun gear 106S of the third planetary gear set 106. The planet carrier 104P of the second planetary gear set 104 and the sun gear 106S of the third planetary gear set 106 are selectively connectable to the planet carrier 108P of the fourth planetary gear set 108 by means of a second connecting mechanism 122. Furthermore, the sun gear 104S of the second planetary gear set 104 is operatively connected to the planet carrier 106P of the third planetary gear set 106.

The planet carrier 106P of the third planetary gear set 106 is operatively connected to the ring gear 108R of the fourth planetary gear set 108. The planet carrier 106P of the third planetary gear set 106 and the ring gear 108R of the fourth planetary gear set 108 are also selectively connectable to the transmission housing 160 by means of a first locking mechanism 128. Hence, the first locking mechanism 128, when being engaged, initially reduces the rotational speed of the planet carrier 106P of the third planetary gear set 106 and the ring gear 108R of the fourth planetary gear set 108, and thereafter locks the planet carrier 106P of the third planetary gear set 106 and the ring gear 108R of the fourth planetary gear set 108 to the transmission housing 160. Furthermore, the ring gear 106R of the third planetary gear set 106 is selectively connectable to the transmission housing 160 by means of a second locking mechanism 130. Hence, the second locking mechanism 130, when being engaged, initially reduces the rotational speed of the ring gear 106R of the third planetary gear set 106, and thereafter locks the ring gear 106R of the third planetary gear set 106 to the transmission housing 160.

Finally, the planet carrier 108P of the fourth planetary gear set 108 is operatively connected to the output shaft 112 of the transmission arrangement 100. Hence, the planet carrier 108P of the fourth planetary gear set 108 is at all times fixedly connected to the output shaft 112.

The above described connecting mechanisms may be respective clutch arrangements which are either wet clutches or dry clutches. The locking mechanisms may be constituted by brake arrangements such as e.g. wet or dry brake arrangements.

According to the example embodiment depicted in FIG. 2, the stationary gear ratio of each one of the first 102, second 104, third 106, and fourth 108 planetary gear sets are negative. According to a non-limiting example, the stationary gear ratio for each of the planetary gear sets may be as described below in Table 1.

TABLE 1

Exemplary stationary gear ratios for the embodiment depicted in FIG. 2.

| First planetary gear set (102) | Second planetary gear set (104) | Third planetary gear set (106) | Fourth planetary gear set (108) |
|---|---|---|---|
| −1.800 | −3.725 | −2.650 | −2.800 |

The above described example embodiment depicted in FIG. 2 is adapted to assume the gears as presented in Table 2 below. As indicated, the transmission arrangement depicted in FIG. 2 assumes nine forward gears and three reverse gears. In Table 2 below, the locking mechanisms are denoted simply as "Brakes" while the connecting mechanisms are denoted simply as "Clutches". A cell marked with a dot indicates an engaged state and a blank cell indicates a disengaged state. Furthermore, Table 2 also indicates non-limiting examples of the gear ratios and steps obtainable by the transmission arrangement for the various gears. The gear ratios and steps presented in Table 2 are derived from the exemplary stationary gear ratios presented in Table 1 above.

TABLE 2

Shift diagram, gear ratios and steps for the different gears.

| Gear | Brakes | | | Clutches | | | | Ratio | Step |
| | 128 | 130 | 132 | 120 | 122 | 124 | 126 | | |
|---|---|---|---|---|---|---|---|---|---|
| 1 |  | • | • | • |  |  |  | 5.91 | 1.55 |
| 2 | • | • |  | • |  |  |  | 3.80 | 1.25 |
| 3 |  | • |  | • | • |  |  | 3.03 | 1.31 |
| 4 |  | • |  | • |  | • |  | 2.31 | 1.33 |
| 5 |  | • |  | • |  |  | • | 1.74 | 1.39 |
| 6 |  | • |  |  |  | • | • | 1.26 | 1.26 |
| 7 |  |  |  | • | • | • |  | 1.00 | 1.38 |
| 8 |  |  | • |  |  | • | • | 0.73 | 1.30 |
| 9 |  |  | • |  | • |  | • | 0.56 |  |
| R1 | • |  | • |  |  | • |  | −6.84 | 1.64 |
| R2 |  | • | • |  |  | • |  | −4.17 | 1.94 |
| R3 |  | • | • | • |  |  |  | −2.15 |  |

As depicted in Table 2 above, the transmission arrangement in FIG. 2 comprises nine forward gears and three reverse gears (indicated with an R). The switching of gears can preferably be executed by one-step gear shifts or by two-step gear shifts. One-step gear shift should be understood to mean that a gear shift is executed from one gear to the next coming consecutive gear, for example, gear shift from the first gear to the second gear, from the second gear to the third gear, from the third gear to the second gear, etc. Two-step gear shift should be understood to mean that a gear shift is executed to exclude a next coming consecutive gear, for example, gear shift from the first gear to the third gear, from the second gear to the fourth gear, from the third gear to the first gear, etc.

As can be seen from Table 2, one-step gear shifting includes only single shifts of the connecting mechanisms and the locking mechanisms, i.e. when executing one-step gear shifts, only one of the connecting mechanisms/locking mechanisms is shifted from an engaged state to a disengaged state, and only one of the connecting mechanisms/locking mechanisms is shifted from a disengaged state to an engaged state. As an example, when shifting from the first forward gear to the second forward gear, it is only the third locking mechanism 132 that is changed from an engaged state to a disengaged state, and only the first locking mechanism 128 that is changed from a disengaged state to an engaged state.

Furthermore, and as depicted in Table 2, also two-step gear shifting when shifting between the forward gears includes only single shifts of the connecting mechanisms and the locking mechanisms. For example, when shifting from the first forward gear to the third forward gear, it is only the third locking mechanism 132 that is changed from an engaged state to a disengaged state and only the second connecting mechanism 122 that is changed from a disengaged state to an engaged state. However, when two-step gear shifting is executed for the reverse gears, double shift occurs, i.e. two of the connecting mechanisms and the locking mechanisms are changed from an engaged state to a disengaged state, and two of the connecting mechanisms and the locking mechanisms are changed from a disengaged state to an engaged state.

An advantage of the transmission arrangement is hence that the shiftability is improved since a reduced number of connecting mechanisms/locking mechanisms need activation/deactivation during gear shifting. In detail, for all one-step gear shifts and for all two-step gear shifts between the forward gears only single shifts occur.

Moreover, with the above described example embodiment of the transmission arrangement 100, further additional and alternative gears are obtainable. Table 3 below illustrates additional and alternative gears which are possible to obtain by the transmission arrangement 100 depicted and described above.

In Table 3, gear 5.5*, gear 8.5* and gear 10* are additional forward gears obtainable by the example embodiment of the transmission arrangement 100 in FIG. 2. Additional forward gear 5.5* has a gear ratio between the fifth and sixth forward gears, while the additional forward gear 8.5* has a gear ratio between the eighth and ninth forward gears. Additional forward gear 10* has a gear ratio lower than the gear ratio of the ninth forward gear. Moreover, reverse gear R2.9* is an additional reverse gear having a gear ratio between the second and third reverse gears. Still further, reverse gear R4* and reverse gear R5* are also additional reverse gears both having a lower gear ratio compared to the gear ratio of the third reverse gear in terms of absolute values. Additional reverse gear R5* is a faster gear compared to the additional reverse gear R4*.

Furthermore, gear 2*, gear 2, gear 2* and gear 2**** are alternative gears to the second forward gear and all have the same gear ratio as the second forward gear. Likewise, gear 7*, gear 7 and gear 7* are alternative gears to the seventh forward gear and have the same gear ratio as the seventh forward gear.

If using the alternative forward gear 7* instead of the seventh forward gear, only single shifts still occur when executing one-step gear shifting of the forward gears. Still further, if adding the additional reverse gears R4* and R5*, the transmission arrangement 100 is able to reverse in a faster speed compared to only including three reverse gears. Also, two-step gear shifting from the second reverse gear to the additional reverse gear R4* will be executed by single shifting. Likewise, two-step gear shifting from the third reverse gear to the additional reverse gear R5* is executed by single shifting. Finally, one-step gear shifts for the reverse gears R1, R2, R3, R4* and R5* is executed by single shifting.

In the following and throughout the entire description, the alternative forward gear 7* is also referred to as the alternative seventh forward gear. Likewise, the additional reverse gear R4* is also referred to as the first additional reverse gear and the additional reverse gear R5* is also referred to as the second additional reverse gear.

TABLE 3

Shift diagram, gear ratios and steps for the different gears.

| | Brakes | | | Clutches | | | | | |
|---|---|---|---|---|---|---|---|---|---|
| Gear | 128 | 130 | 132 | 120 | 122 | 124 | 126 | Ratio | Step |
| 1 | | • | • | • | | | | 5.91 | 1.55 |
| 2 | • | • | | • | | | | 3.80 | 1.00 |
| 2* | • | | • | • | | | | 3.80 | 1.00 |
| 2** | • | | | • | • | | | 3.80 | 1.00 |
| 2*** | • | | | • | | • | | 3.80 | 1.00 |
| 2**** | • | | | • | | | • | 3.80 | 1.25 |
| 3 | | • | | • | | • | | 3.03 | 1.31 |
| 4 | | • | | • | | | • | 2.31 | 1.33 |
| 5 | | • | | | • | | • | 1.74 | 1.13 |
| 5.5* | • | | | | • | | • | 1.55 | 1.23 |
| 6 | | • | | | | • | • | 1.26 | 1.26 |

TABLE 3-continued

Shift diagram, gear ratios and steps for the different gears.

| | Brakes | | | Clutches | | | | | |
|---|---|---|---|---|---|---|---|---|---|
| Gear | 128 | 130 | 132 | 120 | 122 | 124 | 126 | Ratio | Step |
| 7 | | | | | • | • | • | 1.00 | 1.00 |
| 7* | | | | | • | • | • | 1.00 | 1.00 |
| 7** | | | | • | • | • | | 1.00 | 1.00 |
| 7*** | | | | • | • | | • | 1.00 | 1.38 |
| 8 | | • | | | | • | • | 0.73 | 1.12 |
| 8.5* | | • | | | • | | • | 0.65 | 1.16 |
| 9 | | • | | • | | | • | 0.56 | 1.08 |
| 10* | • | | | | • | | • | 0.52 | |
| R1 | • | | • | | | • | | -6.84 | 1.64 |
| R2 | | • | • | | | • | | -4.17 | 1.82 |
| R2.9* | • | | • | | | | • | -2.28 | 1.06 |
| R3 | | • | | | | | • | -2.15 | 1.19 |
| R4* | | • | | • | | • | | -1.80 | 1.30 |
| R5* | | • | • | • | | | | -1.39 | |

Hence, with the transmission arrangement depicted and described in relation to FIG. 2, a plurality of additional gears can be achieved. A further advantage is thus that the transmission arrangement according to the present invention has an increased variability when choosing the gears to be used. Thus, a plurality of alternatives is possible when designing gear shifting of the transmission arrangement.

It is to be understood that the present invention is not limited to the embodiments described above and illustrated in the drawings; rather, the skilled person will recognize that many changes and modifications may be made within the scope of the appended claims. For example, although the present invention has mainly been described in relation to an articulated hauler, the invention should be understood to be equally applicable for any type of vehicle.

The invention claimed is:

1. A transmission arrangement for a vehicle, the transmission arrangement comprising a first, a second, a third, and a fourth planetary gear set comprising a sun gear, a planet carrier and a ring gear, respectively, wherein the transmission arrangement further comprises a transmission housing, an input shaft and an output shaft, wherein
   the sun gear of the first planetary gear set and the input shaft are operatively connected to each other;
   the ring gear of the first planetary gear set and the ring gear of the second planetary gear set are operatively connected to each other;
   the planet carrier of the second planetary gear set and the sun gear of the third planetary gear set are operatively connected to each other;
   the sun gear of the second planetary gear set and the planet carrier of the third planetary gear set are operatively connected to each other;
   the planet carrier of the third planetary gear set and the ring gear of the fourth planetary gear set are operatively connected to each other; and
   the planet carrier of the fourth planetary gear set and the output shaft are operatively connected to each other.

2. The transmission arrangement according to claim 1, wherein the transmission arrangement comprises a first connecting mechanism for selectively connecting the input shaft to the sun gear of the fourth planetary gear set.

3. The transmission arrangement according to claim 1, wherein the transmission arrangement comprises a second connecting mechanism for selectively connecting the planet carrier of the fourth planetary gear set to the sun gear of the third planetary gear set and to the planet carrier of the second planetary gear set.

4. The transmission arrangement according to claim 1, wherein the transmission arrangement comprises a third connecting mechanism for selectively connecting the sun gear of the fourth planetary gear set to the ring gear of the first planetary gear set and to the ring gear of the second planetary gear set.

5. The transmission arrangement according to claim 1, wherein the transmission, arrangement comprises a fourth connecting mechanism for selectively connecting the planet carrier of the second planetary gear set to the planet carrier of the first planetary gear set.

6. The transmission arrangement according to claim 1, wherein the transmission arrangement comprises a first locking mechanism for selectively locking the planet carrier of the third planetary gear set and the ring gear of the fourth planetary gear set to the transmission housing.

7. The transmission arrangement according to claim 1, wherein the transmission arrangement comprises a second locking mechanism for selectively locking the ring gear of the third planetary gear set to the transmission housing.

8. The transmission arrangement according to claim 1, wherein the transmission arrangement comprises a third locking mechanism for selectively locking the planet carrier of the first planetary gear set to the transmission housing.

9. The transmission arrangement according to claim 1, wherein the stationary gear ratio of each one of the first, second, third and fourth planetary gear sets are negative.

10. A vehicle comprising a prime mover and a gearbox, wherein the gearbox comprises a transmission arrangement according to claim 1.

11. A method for controlling a transmission arrangement, the transmission arrangement comprising a first, a second, a third, and a fourth planetary gear set comprising a sun gear, a planet carrier and a ring gear, respectively, wherein the transmission arrangement further comprises a transmission housing, an input shaft and an output shaft, whereby:
the sun gear of the first planetary gear set being operatively connected to the input shaft;
the ring gear of the first planetary gear set being operatively connected to the ring gear of the second planetary gear set;
the planet carrier of the second planetary gear set being operatively connected to the sun gear of the third planetary gear set;
the sun gear of the second planetary gear set being operatively connected to the planet carrier of the third planetary gear set;
the planet carrier of the third planetary gear set being operatively connected to the ring gear of the fourth planetary gear set;
the planet carrier of the fourth planetary gear set being operatively connected to the output shaft; wherein the transmission arrangement further comprises:
a first connecting mechanism for selectively connecting the input shaft to the sun gear of the fourth planetary gear set;
a second connecting mechanism for selectively connecting the planet carrier of the fourth planetary gear set to the sun gear of the third planetary gear set and to the planet carrier of the second planetary gear set;
a third connecting mechanism for selectively connecting the sun gear of the fourth planetary gear set to the ring gear of the first planetary gear set and to the ring gear of the second planetary gear set;
a fourth connecting mechanism for selectively connecting the planet carrier of the second planetary gear set to the planet carrier of the first planetary gear set;
a first locking mechanism for selectively locking the planet carrier of the third planetary gear set and the ring gear of the fourth planetary gear set to the transmission housing;
a second locking mechanism tier selectively locking the ring gear of the third planetary gear set to the transmission housing; and
a third locking mechanism for selectively locking the planet carrier of the first planetary gear set to the transmission housing; wherein for at least one of the gears of the transmission arrangement, the method comprises the steps of:
positioning three of the locking and connecting mechanisms in an engaged state; and
positioning four of the locking and connecting mechanisms in a disengaged state.

12. A control unit configured to control a transmission arrangement, the transmission arrangement comprising a first, a second, a third, and a fourth planetary gear set comprising a gear, a planet carrier and a ring gear, respectively, wherein the transmission arrangement further comprises a transmission housing, an input shaft and an output shaft, wherein:
the sun gear of the first planetary gear set being operatively connected to the input shaft;
the ring gear of the first planetary gear set being operatively connected to the ring gear of the second planetary gear set;
the planet carrier of the second planetary gear set being operatively connected to the sun gear of the third planetary gear set;
the sun gear of the second planetary gear set being operatively connected to the planet carrier of the third planetary gear set;
the planet carrier of the third planetary gear set being operatively connected to the ring gear of the fourth planetary gear set;
the planet carrier of the fourth planetary gear set being operatively connected to the output shalt wherein the transmission arrangement further comprises;
a first connecting mechanism for selectively connecting the input shaft to the sun gear of the fourth planetary gear set;
a second connecting mechanism for selectively connecting the planet carrier of the fourth planetary gear set to the sun gear of the third planetary gear set and to the planet carder of the second planetary gear set;
a third connecting mechanism for selectively connecting the sun gear of the fourth planetary gear set to the ring gear of the first planetary gear set and to the ring gear of the second planetary gear set;
a fourth connecting mechanism for selectively connecting the planet carrier of the second planetary gear set to the planet carrier of the first planetary gear set;
a first locking mechanism for selectively locking the planet carrier of the third planetary gear set and the ring gear of the fourth planetary gear set to the transmission housing;
a second locking mechanism for selectively locking the ring gear of the third planetary gear set to the transmission housing; and
a third locking mechanism for selectively locking the planet carrier of the first planetary gear set to the transmission housing; wherein for at least one of the gears of the transmission arrangement, the control unit (600) is configured to:

position three of the locking, and connecting mechanisms in an engaged state; and position four of the locking and connecting mechanisms in a disengaged state.

\* \* \* \* \*